(12) United States Patent
Lee

(10) Patent No.: US 7,562,591 B2
(45) Date of Patent: Jul. 21, 2009

(54) STEERING ANGLE SENSOR

(75) Inventor: Joong K. Lee, Chatham (CA)

(73) Assignee: KRS Technologies Co., Ridgetown (CA)

( * ) Notice: Subject to any disclaimer, the term of this patent is extended or adjusted under 35 U.S.C. 154(b) by 85 days.

(21) Appl. No.: 11/767,973

(22) Filed: Jun. 25, 2007

(65) Prior Publication Data
US 2008/0007251 A1 Jan. 10, 2008

Related U.S. Application Data

(60) Provisional application No. 60/816,448, filed on Jun. 26, 2006, provisional application No. 60/830,055, filed on Jul. 11, 2006.

(51) Int. Cl.
G06F 17/17 (2006.01)
(52) U.S. Cl. .............. 73/862.331; 324/207.17
(58) Field of Classification Search ............. 73/862.08, 73/862.191, 862.321, 862.325, 862.331; 324/207.17, 207.2, 207.25
See application file for complete search history.

(56) References Cited

U.S. PATENT DOCUMENTS

| 4,465,959 | A  | * | 8/1984  | Yajima ................. 318/696 |
| 4,771,845 | A  | * | 9/1988  | Shimizu ................ 180/446 |
| 4,803,629 | A  |   | 2/1989  | Noto et al.                    |
| 5,119,302 | A  |   | 6/1992  | Abe et al.                     |
| 5,373,444 | A  | * | 12/1994 | Takahashi ............... 701/43 |
| 6,000,491 | A  |   | 12/1999 | Shimizu et al.                 |
| 6,314,355 | B1 | * | 11/2001 | Mizuta et al. ............ 701/41 |
| 6,367,337 | B1 | * | 4/2002  | Schlabach .............. 73/862.331 |
| 6,520,031 | B2 |   | 2/2003  | Madni et al.                   |
| 6,725,734 | B1 | * | 4/2004  | Toratani et al. .......... 73/862.08 |
| 6,761,075 | B2 | * | 7/2004  | Steinlechner et al. .. 73/862.326 |
| 6,820,504 | B2 | * | 11/2004 | Toratani et al. ........ 73/862.325 |
| 6,945,126 | B2 | * | 9/2005  | Toratani et al. .......... 73/862.08 |
| 7,258,027 | B2 | * | 8/2007  | Oike et al. ............. 73/862.331 |
| 7,406,884 | B2 | * | 8/2008  | Jerems et al. .......... 73/862.331 |
| 7,449,878 | B2 | * | 11/2008 | Lee ..................... 324/207.23 |
| 2006/0081070 | A1 |   | 4/2006  | Madni et al.                   |
| 2006/0200290 | A1 | * | 9/2006  | Chino et al. ............ 701/41 |
| 2006/0289227 | A1 | * | 12/2006 | Chino et al. ............. 180/402 |
| 2007/0099465 | A1 | * | 5/2007  | Ruetz ................... 439/164 |
| 2007/0151795 | A1 | * | 7/2007  | Chino et al. ............. 180/444 |
| 2008/0150519 | A1 | * | 6/2008  | Hoeller et al. ........ 324/207.2 |
| 2008/0174302 | A1 | * | 7/2008  | Lee et al. ............ 324/207.16 |

* cited by examiner

Primary Examiner—Lisa M Caputo
Assistant Examiner—Freddie Kirkland, III
(74) Attorney, Agent, or Firm—Gifford, Krass, Sprinkle, Anderson & Citkowski, P.C.

(57) ABSTRACT

An apparatus for determining an angular position of a shaft, such as a steering column, comprises a coil assembly, a coil support, and a coupler element having a coupler angular position correlated with the angular position of the shaft. The coil assembly includes a transmitter coil and at least one receiver coil, the coupler element modifying an inductive coupling between the transmitter coil and at least one receiver coil. A signal processing circuit receives coil signals from the coil assembly and determines the angular position using a receiver signal, and a reference signal that is correlated with an axial displacement but otherwise substantially independent of angular position. The reference signal can be used for ratiometric sensing, to substantially eliminate common mode factors, and also to determine the number of revolutions of the shaft. A combined angle and torque sensor further determines a twist angle across a torsion bar.

12 Claims, 14 Drawing Sheets

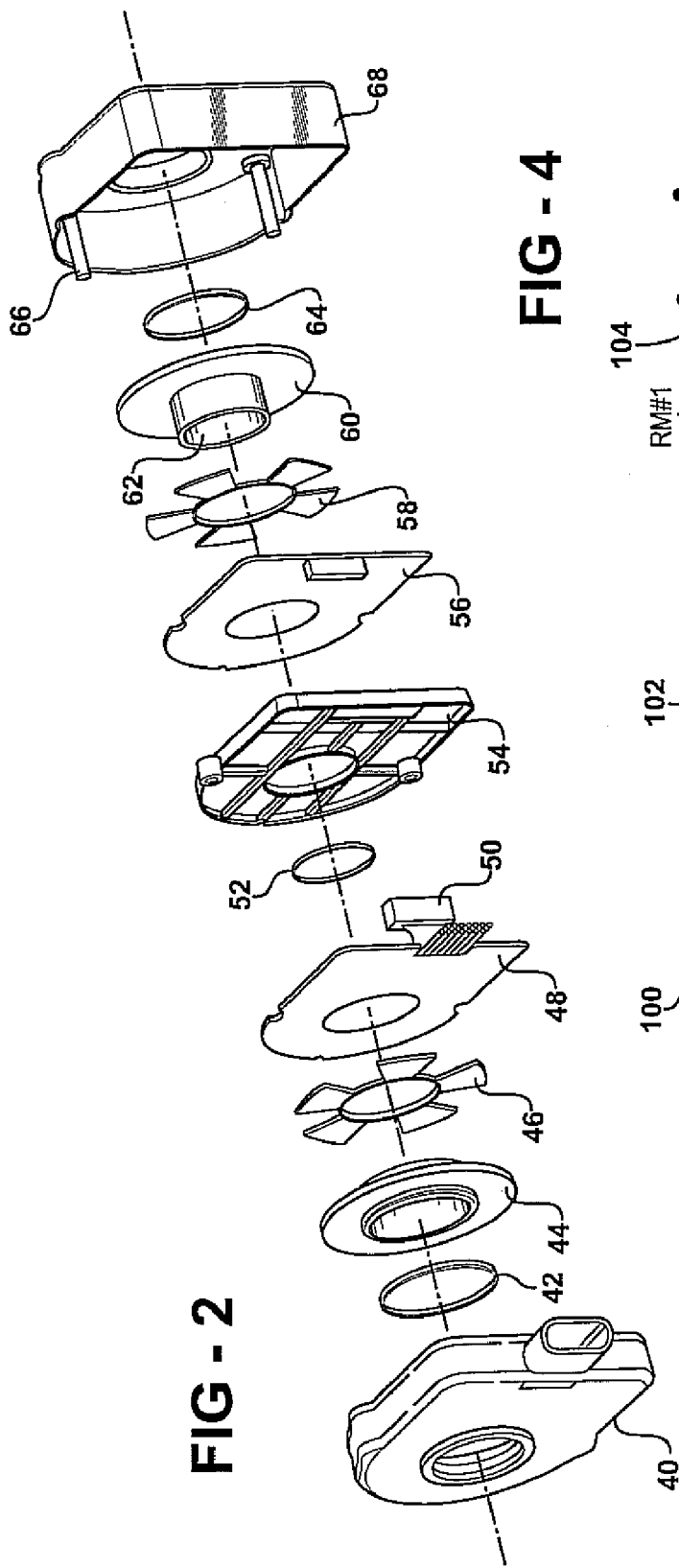
FIG - 2
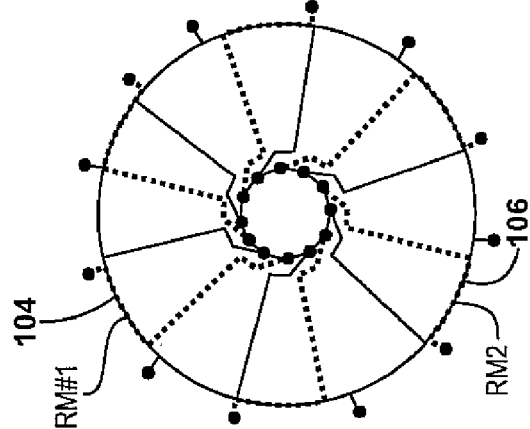
FIG - 4
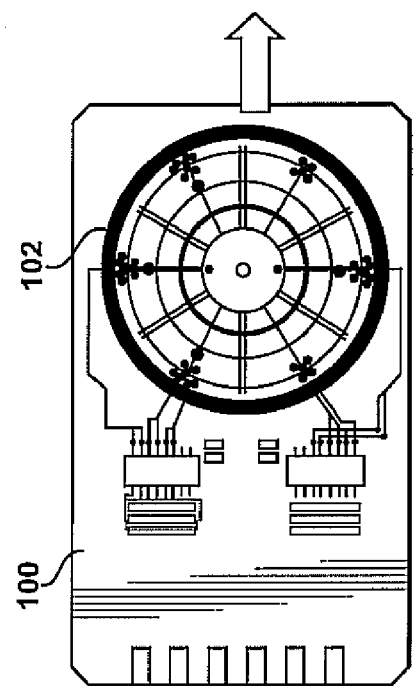

STEERING ANGLE SENSOR

REFERENCE TO RELATED APPLICATIONS

This application claims priority of U.S. Provisional Patent Application Ser. Nos. 60/816,448, filed Jun. 26, 2006, and 60/830,055, filed Jul. 11, 2006, the entire content of each of which are incorporated herein by reference.

FIELD OF THE INVENTION

The invention relates to sensors, including steering angle and torque sensors, and other types of rotational or linear position sensors.

BACKGROUND OF THE INVENTION

Conventional rotational sensors are limited to a 360 degree measurement range. It would be very useful to extend the angular measurement range to allow multi-turn sensing.

A steering assembly for an automobile may include separate angle and torque measurements, with step-down gears used to extend the range of the angle sensors.

SUMMARY OF THE INVENTION

Examples of the present invention include multi-turn sensors for use in angular position (angle) measurement, in particularly for steering angle sensor measurements. Example sensors do not require step-down gears. Examples of the present invention also include combined angle and steering torque sensors, which determine both steering angle and steering torque in an apparatus within a single housing.

An apparatus for determining an angular position of a shaft, such as a steering column, comprises a coil assembly, a coil support, and a coupler element having a coupler angular position correlated with the angular position of the shaft. The coil assembly includes a transmitter coil and at least one receiver coil, the coupler element modifying an inductive coupling between the transmitter coil and at least one receiver coil. A signal processing circuit receives coil signals from the coil assembly and determines the angular position using a receiver signal, and a reference signal that is correlated with an axial displacement but otherwise substantially independent of angular position. The reference signal can be used for ratiometric sensing, to substantially eliminate common mode factors, and also to determine the number of revolutions of the shaft.

A combined angle and torque sensor further determines a twist angle across a torsion bar. An example apparatus for determining steering angle and steering torque, for a steering column including first and second shafts interconnected by a torsion bar, comprises a first rotational sensor operable to determine an angular position of the first shaft (the steering angle) including a coil assembly and a coupler element configured to provide a signal correlated with an angular position of the first shaft, and a reference signal. The reference signal varies with axial displacement between e.g. the coil assembly and the coupler element. As the shaft rotates, it engages a threaded sleeve so as to produce an angular offset that modifies the reference signal. The reference signal is substantially independent of angular position, apart from the mechanically driven change in axial displacement due to shaft rotation. The reference signal can be used to keep track of the number of turns of the shaft, allowing a multi-turn sensor to be developed. A second rotational sensor, associated with the second shaft, includes a second coil assembly and a second coupler element, the second rotational sensor operable to provide a second signal correlated with an angular position of the second shaft. The difference in angular position between the first and second shafts can be used to determine the twist angle and hence torque across the torsion bar. Hence, the steering torque can be determined from the twist angle between the angular position of the first shaft and the angular position of the second shaft, the twist angle being determined using the two sensors.

A reference signal can be used to determine a number of revolutions of the first shaft so as to extend the angular range of the first rotational sensor beyond a single turn (or whatever the modulus angle of the sensor would otherwise be, the modulus angle being that angular range over which a non-repeating signal can be obtained). The reference signal (for example, voltage level thereof) can be mapped to a number of turns of a shaft. A voltage level can be adjusted according to the number of turns so that a monotonic and possibly substantially linear signal can be obtained over multiple turns without need for a step-down gear.

A coil assembly may include a plurality of receiver coils and an optional reference coil, which is used to provide the first reference signal. In other examples, a reference signal may be obtained from a combination of receiver signals. This approach is generalized, and may be used with other angle sensors, such as Hall effect sensors. A coil assembly may include a plurality of receiver coils, and the reference signal determined using a plurality of receiver signals obtained from such coils.

The axial displacement may be that between a coil assembly and a corresponding coupler element. For example, a PCB or other coil support may be supported by a threaded support that is urged in an axial direction by rotation of a shaft that engages the threaded support. Alternatively, the coupler element may be moved as the shaft rotates, or other configuration used to obtain the axial displacement. The axial displacement may increase or decrease according to the direction of rotation.

In some examples, the twist angle may be determined using a digital signal processor, for example using a difference between digitized signals representing first and second angles across the torsion bar. In some examples, the twist angle may be determined directly, for example by determining the angle of a second shaft relative to a first shaft. Representative examples relate to shafts as components of a steering column. However, embodiments of the present example include determining the rotational position beyond a single turn for any rotating shaft, in which rotation of the shaft produces an axial displacement that is used to modify an electrical signal, the electrical signal being used to determine the number of rotations.

A coil support may be a printed circuit board, and the printed circuit board may further supporting a signal processing circuit.

BRIEF DESCRIPTION OF THE DRAWINGS

FIG. 2 shows an exploded view of a steering angle sensor;

FIG. 4 shows an example PCB arrangement;

FIGS. 22A-22C show reference signal generation using full wave rectification of three sensor signals;

DETAILED DESCRIPTION OF THE INVENTION

Figure 1A:
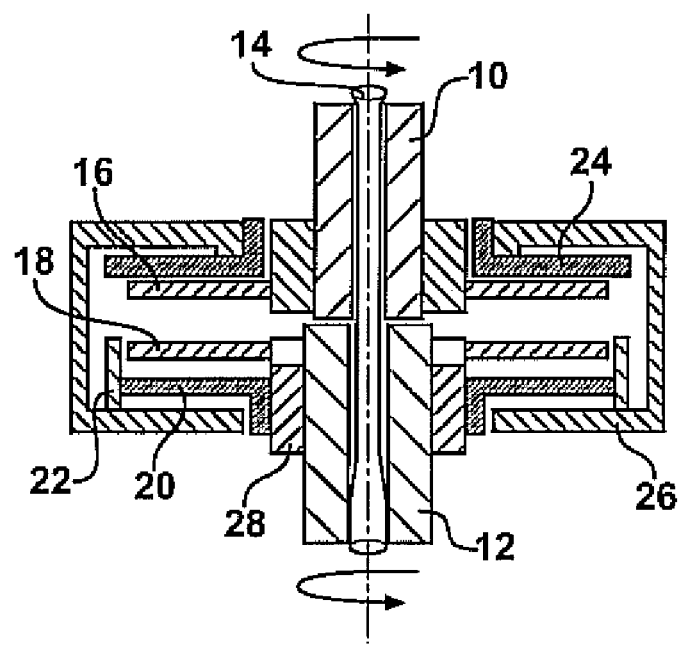
FIGS. 1A-1B show a steering assembly with angle and torque sensors.

Embodiments of the present invention include an electronic module, a coil body, trimmed resistors, and signal conditioning circuitry. The electronic module may comprise an ASIC module for signal conditioning. The coil body comprises an axial modulator, a rotational modulator, and an exciter coil. The exciter coil generates an electromagnetic field. The rotational modulator (also referred to as a receiver coil or sensor coil) provides a signal correlated with angular position. The axial modulator (also referred to as reference coil or differential dummy) provides a signal corresponding to an axial separation or gap between the exciter coil and the axial modulator. In some examples, the reference coil can be omitted, and a separate reference signal obtained from the sensor coils.

Embodiments of the present invention also include ratiometric sensors of any type, not limited to inductive position sensors. A reference signal is obtained from one or more sensors, the sensors also providing sensor signals correlated with position. An electronic unit is used to provide a ratiometric signal by division of the sensor signal by the reference signal, the ratiometric signal being corrected for common mode factors such as temperature. In other types of sensors, an exciter coil need not be used, or other types of excitation used. A general ratiometric sensor includes one or more sensors, and an electronic unit for generating a reference signal from the one or more sensors, and generating a ratiometric signal using the reference signal and a sensor signal, the ratiometric signal being correlated with position. There are also applications of the present invention outside of position sensors, including status monitoring sensors and the like.

Examples of inductive sensors are described in detail below, but these examples are not limiting. In some examples, a coupler element (sometimes termed an eddy plate) modifies the inductive coupling between the exciter coil and the other coils. The coupler element modifies the spatial distribution of the flux coupling between the exciter coil and the receiver coil(s).

In an example rotational sensor, the output of a rotational modulator (RM) type of receiver coil is correlated with the angular position of the coupler element, whereas the output of an axial modulator or reference coil is substantially independent of the coupler position as a function of rotation angle, so that ratiometric sensing allows substantial elimination of the effects of common mode factors on the receiver signal. Common mode factors include exciter power, temperature, gap between a coil assembly and a coupler element, and the like). The reference signal from a reference coil may be correlated with the axial distance, or gap, between the reference coil and the coupler element, or other sensor component.

Embodiments of the present invention include a combined steering torque/steering angle sensor with multi-turn capability. Conventional rotation sensors are often limited to a 360 degree measurement range, necessitating the use of step-down gears for larger (multi-turn) angle measurements. However, rotation sensors according to the present embodiment may provide a measurement range greater than 360 degrees, for example up to ±820 degrees.

For example, the measurement range can be extended beyond 360 degrees using a reference signal that is substantially independent of the rotational position of the coupler element, but correlated with an axial displacement. A reference signal, which in this example may be termed an axial modulator (AM) signal, can be provided that is sensitive to the gap between the coupler element (rotor) and a printed circuit board (PCB) that is mounted on a thread sleeve. The PCB supports a coil assembly, comprising an exciter coil, one or more receiver coils, and an optional reference coil. As the steering mechanism is rotated on the thread, this axial gap is narrowed or widened, modifying the reference signal and allowing a determination of the number of rotations (or other angular period) that have been turned.

In some examples, a separate reference coil is not required, as a reference signal may be obtained from a plurality of receiver coils, for example through combination of non-phase-sensitive rectified signals. The reference signal, however determined, generally varies with displacement of a coil assembly relative to the coupler element. For example, the element coupler may be attached to a rotating shaft, and the displacement due to rotation of an outside threaded sleeve attached to the shaft within an inside-threaded sleeve within the coil body. In this case, the reference signal can be used to determine approximately the number of rotations made, facilitating development of a multi-turn sensor.

Trimmed resistors may allow output gain control, definition of upper and lower plateau voltages, or other adjustment. A modulated signal may be obtained by multiplying the angle-dependent signal by the exciter signal. In this context demodulation refers to phase-sensitive rectification of the modulated signal. Demodulation extends the range of linear angle measurement to twice the amount without it. The demodulator may be tested independently of the coil body, and may be a module having a trimmable resistor and LC oscillator.

Examples of the present invention also include torque sensors, including standalone torque sensors and torque sensors that are combined with a steering angle sensor. The torque sensor may be configured along the lines of an electronic pedal sensor as described in our co-pending applications. The torque sensor may be provided with a CAN bus compatible output, and PWM (pulse width modulation) in parallel with a raw signal output.

An example combined rotational and torque sensor includes two rotational sensors, one sensor at each end of a torsion bar. One sensor is used for measuring angular position, for example steering position for use as an electronic steering sensor. The two sensors together measure the twist angle of the torsion bar, from the difference in rotational positions of each end of the torsion bar. The torque is determined from the twist angle and the mechanical properties of the torsion bar. The torsion bar may be any structure, such as a spring, from which torque may be determined from the relative rotational positions of the ends.

FIG. 1A shows a side view of a steering assembly, comprising a steering side shaft and a column side shaft. The figure shows pinion-side steering shaft 10, column side shaft 12, torsion bar 14 interconnecting the pinion-side and column-side shafts, pinion-side coupler element 16, column-side coupler element 18, column-side sensor PCB 20, slider 22, pinion-side sensor 24, housing 26, and threaded sleeve 28.

The PCB (printed circuit board) 20 is mounted on a threaded sleeve 28, which advances the PCB as the steering column is rotated. The figure shows a gap between the angle sensor PCB and a torque coupling device. This distance is variable with rotation of the steering assembly.

Angle information may be retained in circumstances such as the wheel turning during a power loss. In some examples, gap information is mapped to a sawtooth electrical signal.

A combined sensor for steering angle and torque determination may be a stand-alone sensor, with a housing and simple attachment to the steering column. The column side coil assembly may be free to move an appreciable distance, such as up to 6 mm, along the axial direction, with the reference signal being used to determine axial displacement and hence a number or revolutions. The sensors for each side of the torsion bar may be similar, and comparison of the signals used for self-diagnosis, for example to detect a fault condition. For example, the twist angle in normal operation may not exceed ±15° or some other predetermined value, without a fault being indicated.

Figure 1B:
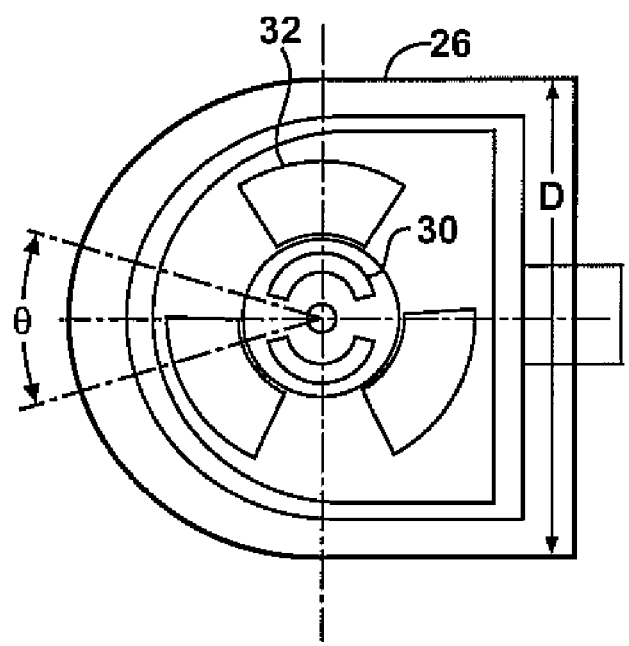

FIG. 1B is a simplified end view showing the parts of the torque sensor, also showing a stopper 30 to protect the torque device. The maximum twist angle allowed may be restricted to an angle θ, such as 7.5°. The figure also shows possible a relative configuration of coil lobes for a three-pole receiver coil (RM). In one example, the dimension d was approximately 80 mm, illustrating the compact nature of the device.

FIG. 2 shows an exploded view of another example sensor operable to determine steering angle and torque. In this example, the coupler element is referred to as a rotor. The components shown include connector housing 40, O-ring seal 42, rotor carrier 44 (first coupler element support), rotor 46 (first coupler element), torque measurement PCB 48, flat jumper cable 50, cylindrical seal between two rotor carriers 52, PCB carrier 54, angle measurement PCB 56, rotor 58 (second coupler element), threaded rotor carrier 60 with threaded portion 62, O-ring seal 64, and housing portion 68. The steering angle is determined as the angle of the second coupler element relative to a coil assembly carried by the angle measurement PCB. The torque is determined by an angular difference between the first and second rotors, determined by the position of the first coupler element and the torque measurement PCB.

Figure 3A:
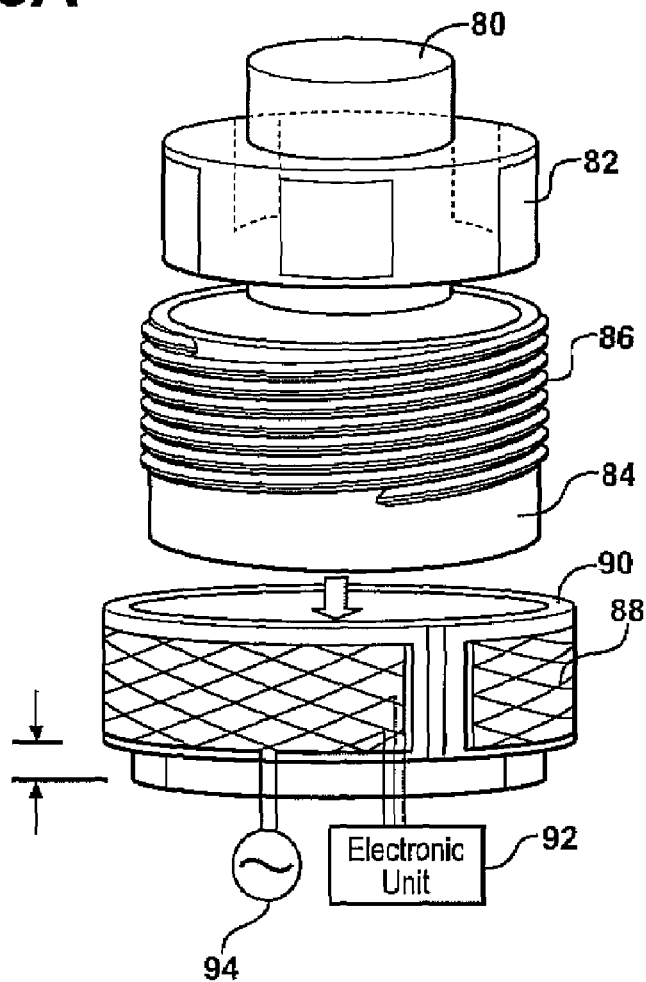
FIGS. 3A-3B show a configuration using a cylindrical coil assembly.

FIG. 3A illustrates an alternative configuration in which receiver coils are disposed on a generally cylindrical surface. The figure shows rotating hub 80, coupler elements 82, first sleeve 90 acting as a generally cylindrical substrate (coil support) for coil assembly 88, second sleeve 84 having threaded portion 86, electronic unit 92, and energizing source 94 for the excitation coil.

The sensor is disposed on rotating hub 80, with an arrangement of coupler elements 82 generally disposed around a cylindrical surface. Rotation of the sleeves relative to each other causes an axial displacement (gap) between the coupler elements and the coil assembly 88. The coil assembly includes a plurality of receiver coils with a generally rectangular (on the cylindrical surface) exciter coil around the periphery. The combination of coils and coil support may be referred to as a coil body. A reference signal can be determined from a combination of receiver signals, substantially independent of coupler angular position, and this may be used to determine the number of rotations. Alternatively, a separate reference coil may be disposed on the coil support to provide the reference signal. Hence, this configuration may be used as a multi-turn sensor.

This figure only shows the angle sensing portion of a combined sensor, but torque sensing may use an analogous configuration.

A torque determination may be made by comparing the signals of first and second sensors each side of the torsion bar, for example to determine a difference signal.

Figure 3B:
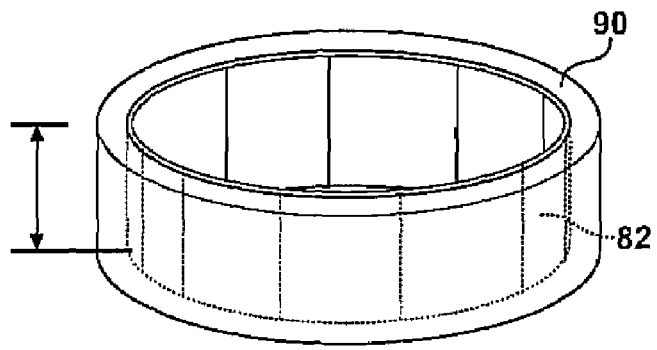

FIG. 3B shows the sensor coil body relative to the coupler elements located on the inside of the second sleeve. The figure shows first sleeve 90 relative to coupler elements 82 at the zero axial displacement (zero gap) configuration.

FIG. 4 is a schematic showing a general arrangement of a PCB for use with a multi-turn rotation sensor. This form of PCB is useful for electronic throttle control applications. However, the shape of the PCB may be readily adapted for any angle-sensing applications such as steering angle sensing. The PCB 100 supports a coil assembly comprising a double rotational modulator (arranged so that a second receiver coil provides a signal with a phase offset of 90 degrees (one quarter wavelength) relative to the first receiver coil. FIG. 4A shows a general arrangement of coil assembly and support electronics, and FIG. 4B shows a configuration of the first and second coils, 104 and 106, denoted RM1 and RM2. The use of a double rotational modulator, with two coils, allows angular sensing applications beyond the linear segment of a single coil signal.

Figure 5:
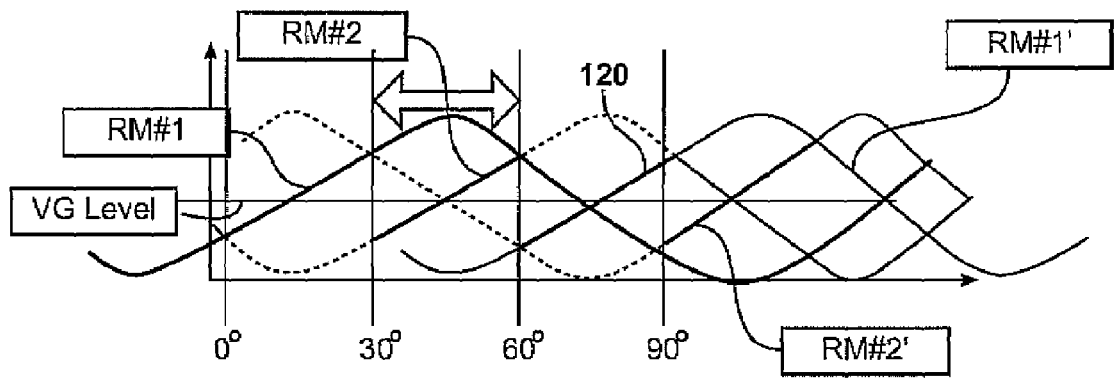
FIG. 5 show receiver coil signals that can be used to obtain a linear response over a wide angular range.

FIG. 5 shows a signal from the first coil, denoted RM1, and a signal from the second coil, denoted RM2. As shown, there is an angular offset between the signals from each coil relative to the angular position of the coupler element, and hence the steering assembly in a steering angle application. The figure also shows signals labeled RM1' and RM2', which are the inverted versions of RM1 and RM2. Hence a linear signal over a wide angular range can be pieced together using segments from each signal, the linear portions of each curve being shown using a thick line such as 120. RM1 is shown as a solid line having a linear region between 0 degrees and 30 degrees. RM2 is shown generally as a dashed line with a linear region between 30 degrees and 60 degrees. Further, the inverted version of RM1, denoted RM1', is shown as a thin solid line and this provides the linear region between 60 degrees and 90 degrees. The inverted version of RM2, labeled RM2', provides a linear segment between 90 degrees and 120 degrees.

In examples of the present invention, a coil body may comprise two receiver coils, having a receiver coil signal phase difference of 90 degrees. Other phase differences may be used.

Hence, two pairs of signals (signals from the first and second RM coils and the reflected versions thereof) can be combined into a substantially linear signal through shifting of a voltage level.

Figure 6:
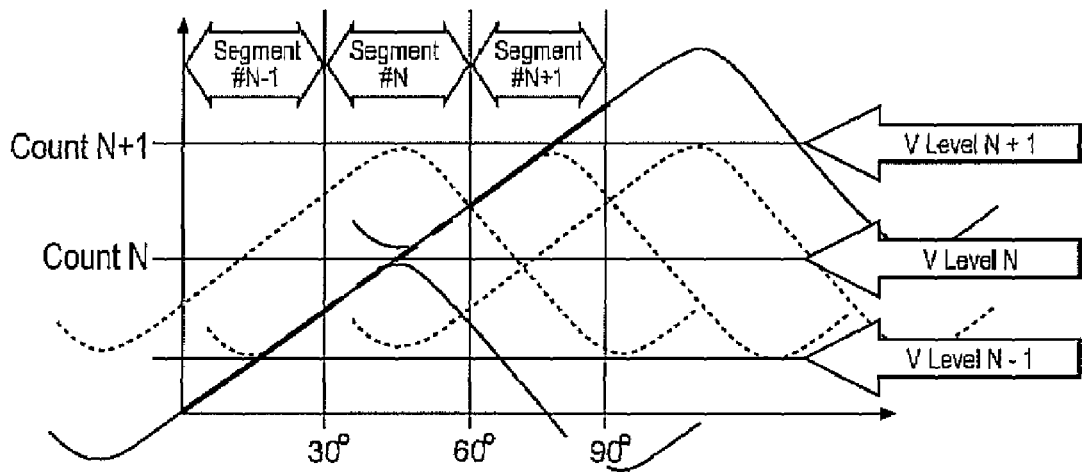
FIG. 6 shows how offsetting a reference voltage is used to obtain a substantially linear positional signal over a wide angular range.

FIG. 6 shows how offsetting a reference voltage may be used to obtain a linear positional signal over a wider angular range than may be obtained from a single coil alone.

To get a substantially continuous linear signal, crossing points between the various RM signals must be determined. For each linear segment N−1, N, N+1, there is a corresponding offset voltage selected to match the maximum signal level of one linear range with the minimum signal level of the next linear range.

Figure 7:
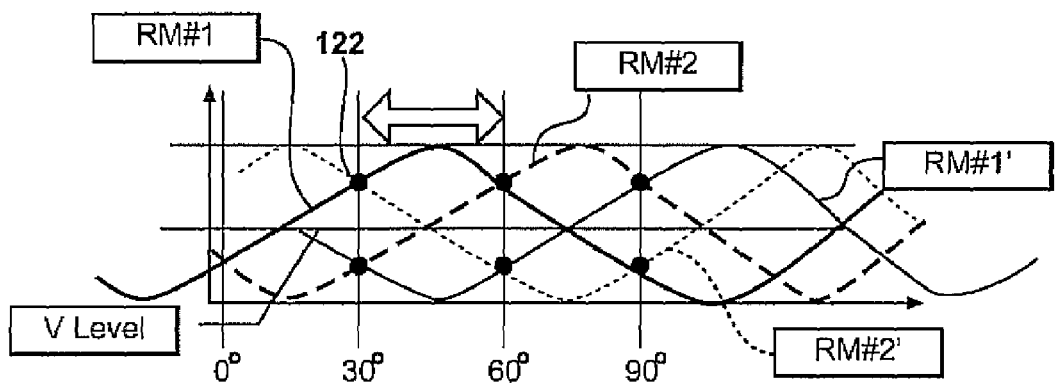
FIG. 7 shows crossing points between two receiver signals and inverted versions thereof.

FIG. 7 shows crossing points between RM1, RM2, and the inverted versions thereof, as circles such as 122. A simple comparator circuit may be used to determine the crossing points, and select a signal from a plurality of available signals according to the actual angular position within an angular range. Hence, a rotation sensor according to embodiments of the present invention may be used to provide a linear signal over a wide angular range.

Examples of the present invention include apparatus using a reference signal substantially independent of rotational position. However, the reference signal is correlated with axial position, along an axis orthogonal to the plane of rotation (for example, along the axis of a rotating shaft). Hence, a reference coil, in this example an axial modulator, may be used to provide a signal that is sensitive to the gap between a circuit board supporting a coil assembly, and the coupler element. Effectively, the axial modulator acts as a gap sensor, or axial displacement sensor, and the reference signal can be used to determine how many turns the steering assembly has made.

In some embodiments, the AM feedback to the carrier (exciter signal) is replaced by a constant voltage divider. This avoids separating a temperature factor from the common mode signals that are canceled out by ratiometric sensing. Hence, the gap becomes the major common mode factor, so that the AM may effectively provide information on the number of turns. In this configuration, the exciter signal would remain at (for example) approximately 10 volts, and the reference signal can be monitored to map the reference voltage to a number of turns.

Figure 8:
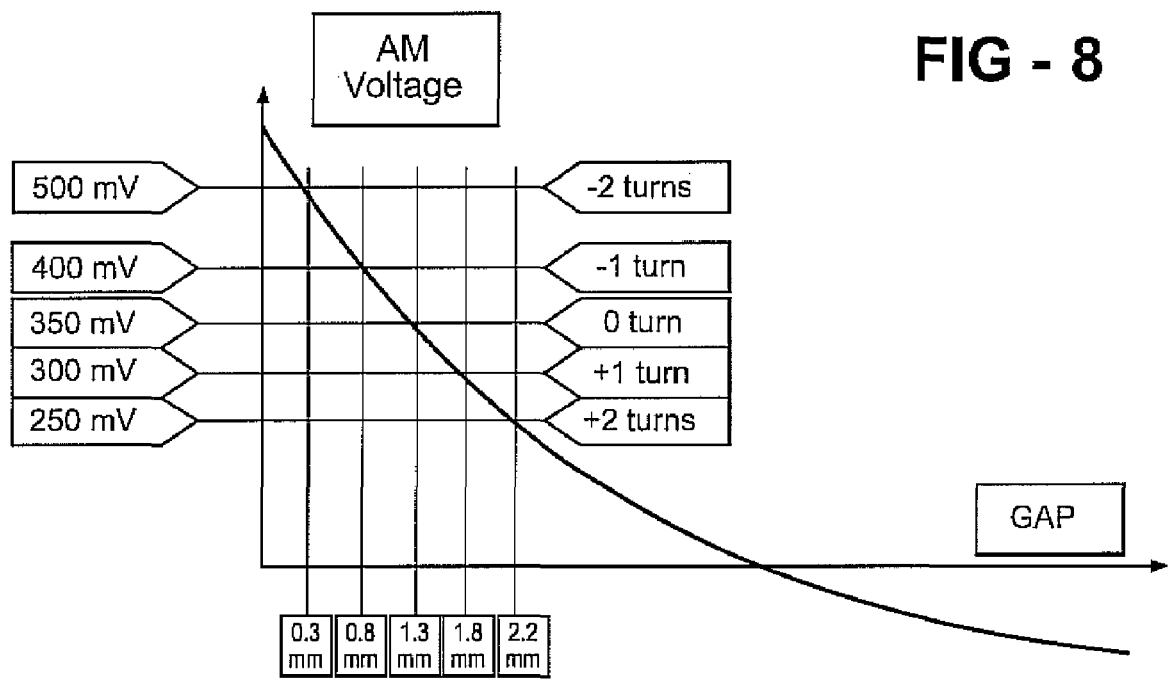
FIG. 8 shows a relationship between reference signal voltage and axial displacement, which can be used to monitor a number of revolutions for a multi-turn sensor.

FIG. 8 shows a representative relationship between reference signal voltage (here denoted AM voltage) and axial displacement (here denoted gap), for an example according to the present invention. The gap is shown along the X axis, and ranges up to approximately 2.2 millimeters. The reference signal voltage varies between approximately 250 millivolts for two turns past the 0 position to approximately 500 millivolts for two turns in the opposite direction. Here, 0 turns corresponds to approximately 350 millivolts. In other examples, the voltages and distances may be different. This mapping is an example only, and the actual relationship may be determined for the configuration used.

Using data such as shown in this figure, the receiver signal voltage level can be adjusted to obtain a substantially linear response over a wide angular range, even multi-turn capabilities. By adjusting the sensor output voltage level according to the number of turns, a substantially linear signal versus angle of turn can be obtained over multiple turns.

Figure 9:
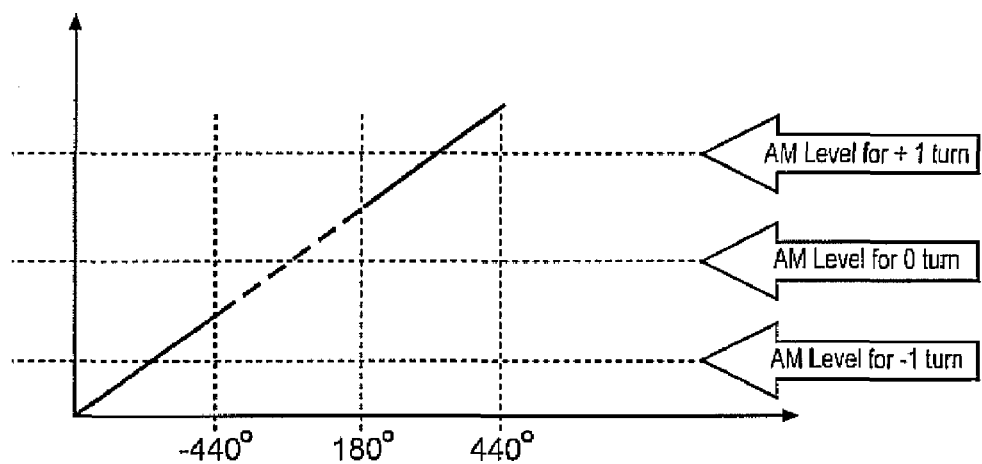
FIG. 9 shows a representative example of mapping of reference signal voltage to number of turns.

FIG. 9 shows a representative example of mapping of reference signal voltage to number of turns, allowing an adjustable offset voltage used to be used to obtain a substantially linear sensor signal voltage versus angle over multiple turns.

Figure 10:
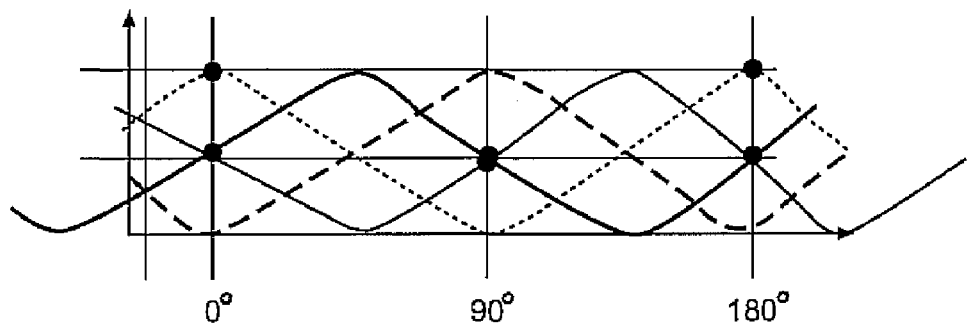
FIG. 10 shows signals obtained from a two pole receiver coil.

FIG. 10 shows the signals obtained from a two pole receiver coil, showing four signals obtained from the two coils, along with inverted signals, analogous to those shown in FIG. 5. In this example, each signal repeats every 180 degrees, so that a reference signal (AM signal) is required to distinguish the angular position over angular ranges greater than 180 degrees.

In a multi-turn sensor, the voltage level is lifted after picking another signal. This refers to transitioning from one signal output to another signal output at a crossing point such as shown earlier in FIG. 5. A logic stack can be used to store the history of crossing points, and hence know the correct voltage level adjustment to apply. The selection of RM signal (or inverted RM signal) can be selected using a multiplexer output when a predetermined RM value is reached.

Three examples of sensor signal output formats are now described. In one format, the signal can be selected as one of three types of sawtooth signal. The first format is a 360 degree sawtooth ranging from 0.25 volts to 4.75 volts. A second format may be a 180 degree sawtooth over the same voltage range, and a third format may be a 90 degree sawtooth over the same voltage range. Multiple turn sensors can then be obtained using an offset voltage to convert a sawtooth waveform into a substantially linear response.

Figure 11:
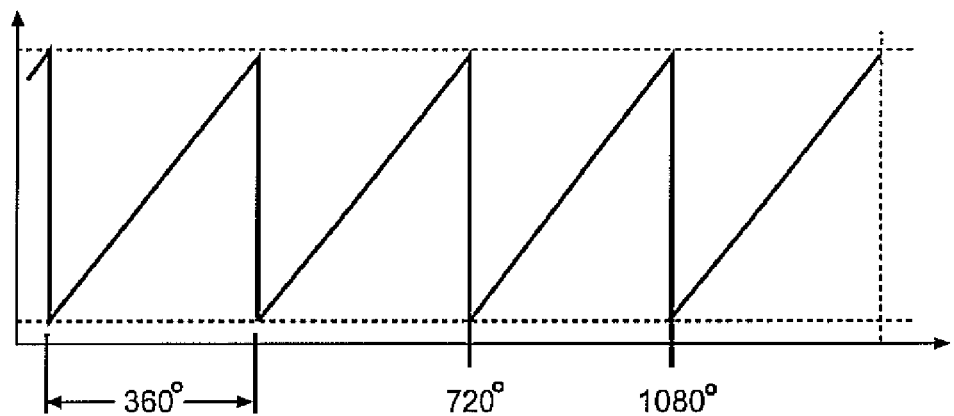
FIG. 11 shows an example sensor signal output format.

FIG. 11 shows a possible sensor output format. The output signal is a sawtooth ranging between upper and lower voltage ranges and resetting every 360 degrees of angular measurement.

Figure 12A:
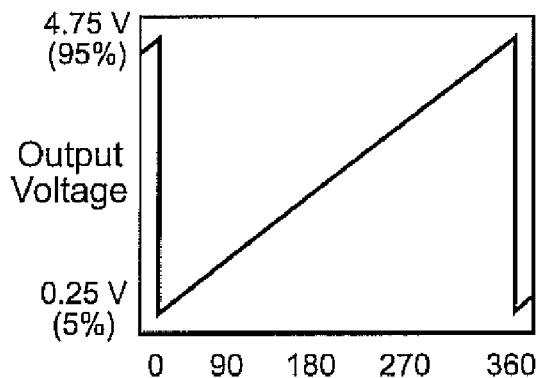
FIG. 12A-12C show three sensor output formats.
Figure 12B:
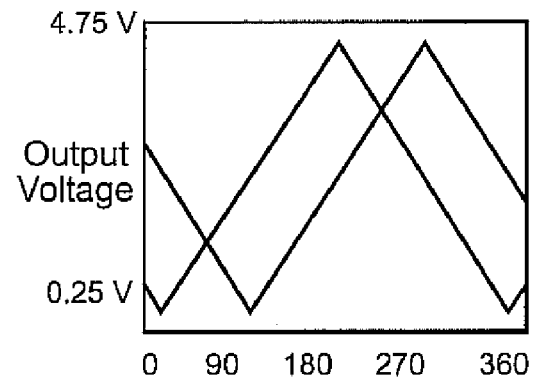
Figure 12C:
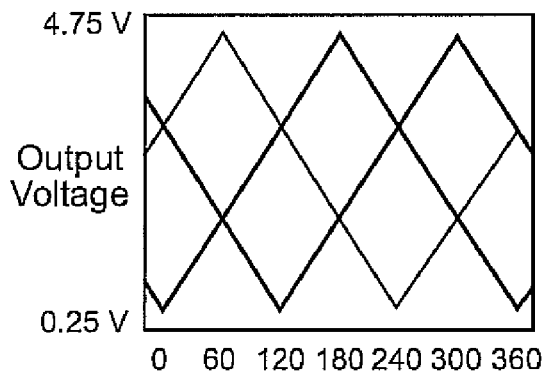

FIG. 12A-12C show three possible alternative formats. Signal calibration may be obtained using Zener zapping, which is discussed in further detail below.

Figure 13:
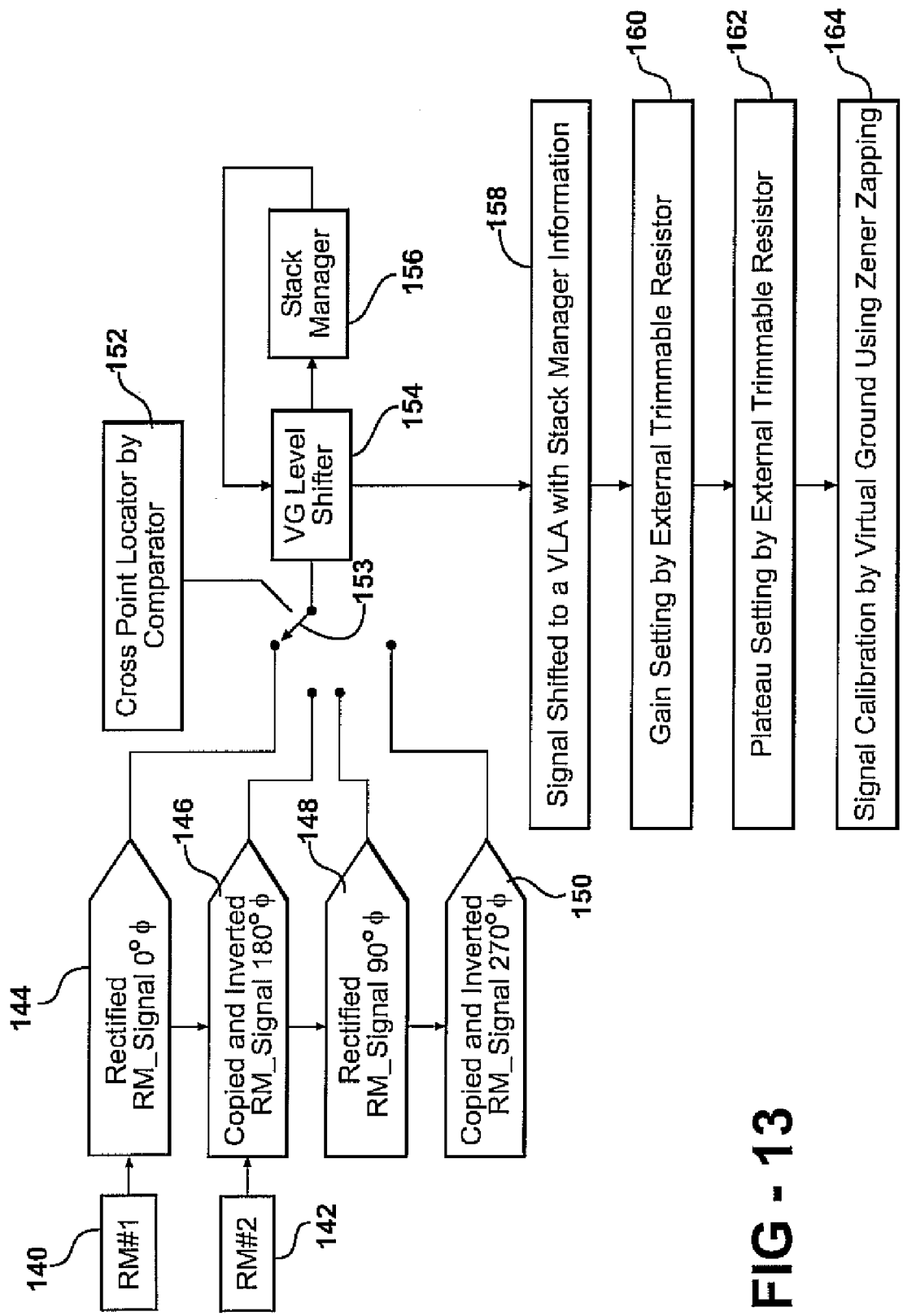
FIG. 13 shows a possible signal processing circuit for use with a coil assembly.

FIG. 13 shows a block diagram of a signal conditioning approach which may be used by a signal processing circuit associated with a coil assembly. The electronic circuit may be supported on the same PCB as the coil assembly. The figure shows first receiver coil 140, second receiver coil 142 (both rotational modulators, i.e. providing a signal correlated with angular position of a coupler element), electronic circuitry to provide first and second rectified signals (144 and 148), and copied and inverted versions of the first and second signals (146 and 148). A comparator 152 allows selection of one of the four signals using an electronic switch 153. A virtual ground shifter 154 provides signal offset, with a stack manager 156 keeping track of the angular range and hence offset used. A signal shifter 158 then shifts the signal to a VLA using information obtained from the stack manager, a gain control (160) is set for example using an external trimmable resistor, a plateau voltage control (162) limits maximum and minimum excursions, for example using external trimmable resistor(s), and a calibrator (164) calibrates the signal using for example Zener zapping.

A comparator may select a second signal, switching from a first signal when the first and second signals are similar within a predetermined tolerance. A logic stack may be used to keep track of the selections.

In this example, the first and second RM signals are rectified, to provide first and third signals respectively, and further being inverted to provide second and fourth signals respectively. The four signals obtained correspond to the curves shown, for example in FIG. 5. A comparator is used to determine the correct crossing points from one signal to another, for example as illustrated in FIG. 7, so as to obtain a substantially linear signal, for example as shown in FIG. 6. The VG (virtual ground) level shifter is in communication with a stack manager. The logic stack keeps track of the crossing points so that the correct virtual ground level shift is applied to the signal, so as to obtain a substantially linear or sawtooth signal. The signal processing includes sensing the signal to a VLA with stack manager information, setting the gain, using for example external trimmable resistors, setting upper and lower plateau voltages using external trimmable resistors, and signal calibration. Signal calibration may be obtained by Zener zapping.

Figure 14:
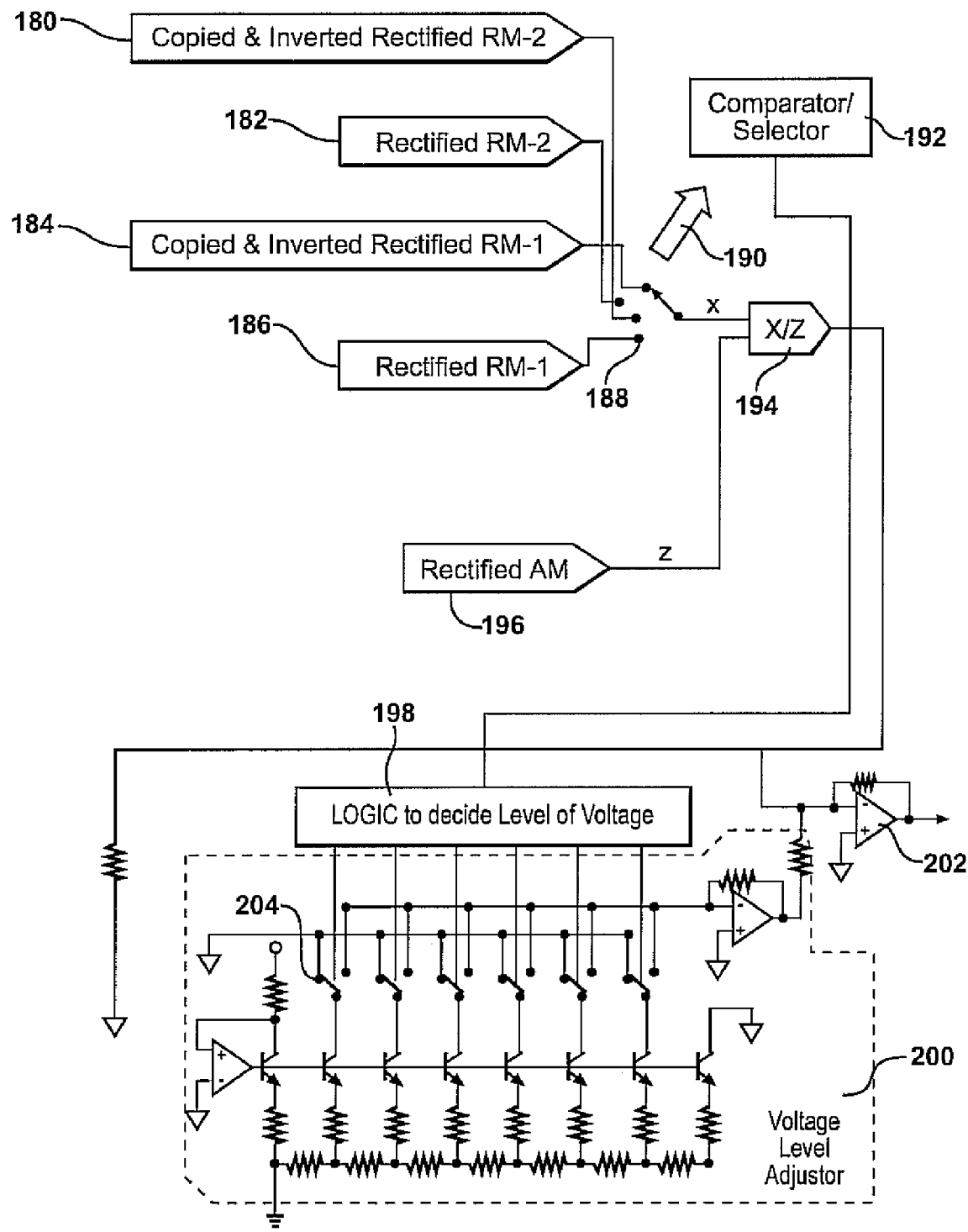
FIG. 14 shows a simplified block diagram for a signal processing circuit.

FIG. 14 is a simplified block diagram for a signal processing circuit, which does not shown plateau control and gain adjustment. In this example four input signals, comprising RM1, RM2, inverted RM1, and inverted RM2, enter a switching circuit where the comparator selector determines the correct signal to use. The figure shows a representative circuit that can be used to rectify RM1. The rectified AM signal is obtained and enters a divider along with the selected RM signal. The divided signal is then passed through a voltage level adjuster to the output. The figure shows the voltage level adjuster comprising a plurality of switched circuits input to a logic circuit to decide the voltage adjustment. The history of voltage adjustment is stored within the comparator.

Digital-to-analog converters can be used for sensor calibration and for voltage level control. A calibration circuit may be in five bit form, and Zener zapping used to calibrate the final assembly. In Zener zapping, a large current in the reverse direction is applied to a Zener diode, which breaks down creating a short circuit. An array of shorted and non-shorted diodes can be used as a non-volatile memory to store an adjustment voltage, for example as a binary value. Hence, a calibration adjustment can be made once, and further adjustment not used.

The converter for voltage level adjustment is shown in six bit form, which depends on the polarity of the sensor, and the positioning angle range. For a five polarity sensor, with 360° degree range, the converter requires four bits; in the case of a six polarity sensor, with 360° range, the converter uses five bits. The operation of the converter may be controlled by the comparator circuit in collaboration with the logic circuit.

Regarding the logic circuit-comparator circuit operation, as soon as the comparator has selected one of two incoming signals, according to the angular direction, the logic circuit pushes in or pops out a unit voltage adjustment.

Referring back to FIG. 7, this shows the first crossing point to be at 30 degrees. The comparator circuit compares RM1 and RM2, and at 30 degrees they are identical within a certain predetermined tolerance. The selector circuit then selects the RM2-signal (inverted RM2) so that the output signal is maintained in a substantially linear fashion as shown in FIG. 6.

At the same time, the logic circuit increases or decreases a unit. The logic circuit (the stack) pushes in or pops out one unit, and correspondingly the voltage converter increases or decreases one unit voltage level. This is shown, referring back to FIG. 6, as voltage level N, N+1, etc. Hence the logic unit maintains the status of the switches within the DA converter, corresponding to the depth of the stack.

Using a three pole coil, the maximum reasonable linear angular range, indicated as the segment, is approximately 30 degrees. The voltage level is set according to the number of crossing points passed through. The angular range can be as large as 120 degrees using the management of three segments. Record keeping may be achieved using stack operation, for example a linked list data structure.

The format of the output signal may be a sawtooth signal for multi-turn operation, with the reference signal being used to resolve ambiguity from the multi-valued angle values (beyond 360°) corresponding to each signal voltage. This approach allows the sensor signal to have good angular resolution, while also having a wide (e.g. multiple revolution) angular range. The practical maximum linear capability (modulus angle) is 360 degrees. A counter and stack may be managed by a local ECU outside the sensor, or alternatively can be managed by the sensor logic.

Figure 15:
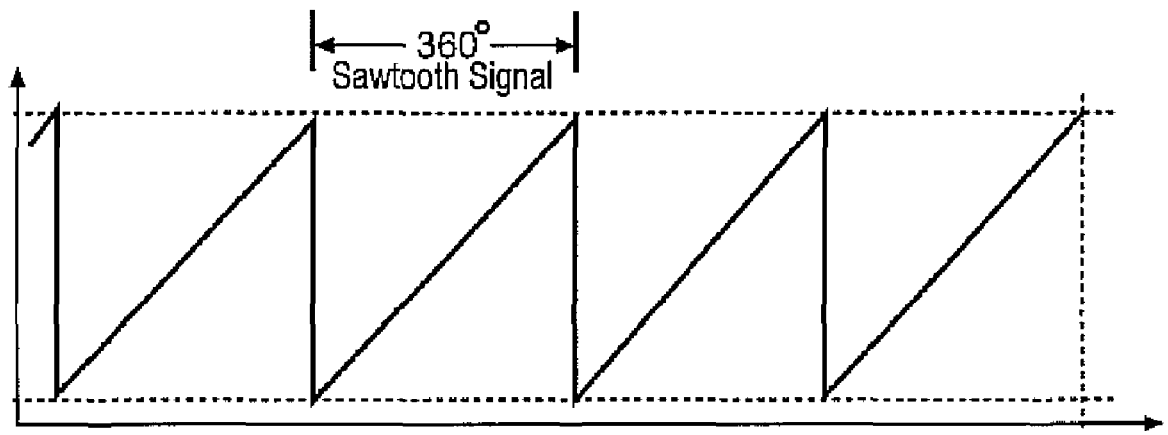
FIG. 15 shows, an output signal output from a four turn rotation sensor with a 360 degree sawtooth signal output.

FIG. 15 shows an output signal output from a four turn rotation sensor with a 360 degree sawtooth signal output.

Figure 16:
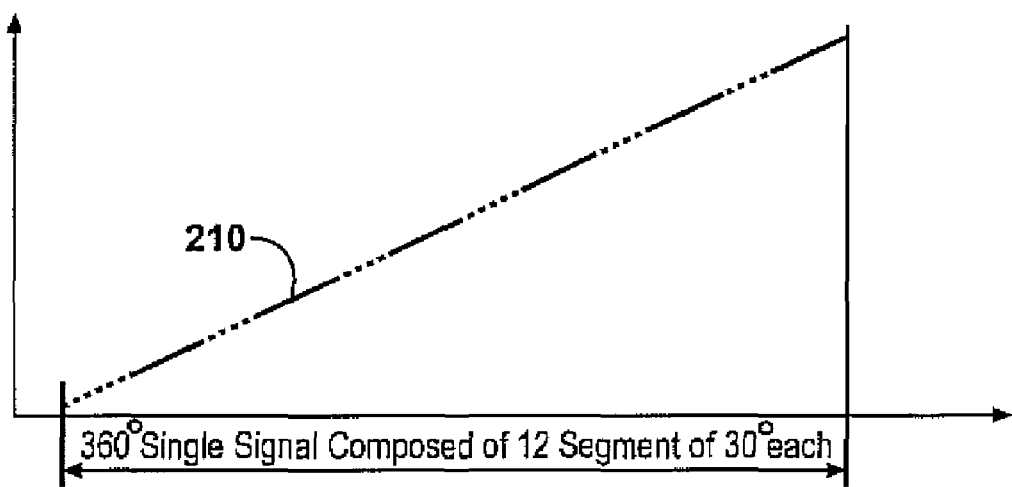
FIG. 16 shows a single linear signal comprising 12 segments of 30 degrees each.

FIG. 16 shows a single linear signal comprising 12 segments of 30 degrees each, such as shown at 210, for example as obtained from a three pole RM coil. If a six pole RM coil is used, a single linear signal may have 24 segments of 22.5 degrees. In the latter case, the voltage level adjuster and logic/stack circuits may have five bit capability.

Other considerations include the supply voltage traceability, the use of a direct battery voltage or a regulated voltage, and the desired linearity. Examples sensors according to embodiments of the present invention include sensors having a linearity of better than 0.5% in angle sensor operation. Other embodiments of the present invention include speed sensors that may be implemented using displacement measurements obtained from the AM signal.

An example sensor system was made, which had an angle linearity of 0.5%, accuracy of 0.5% over a temperature range of −45° C. to 100° C., having a 360 degree sawtooth output, an output signal swing from 5% to 95% of the reference voltage, 5 bit Zener zapping, 4 bit voltage level adjustment, and excellent EMC performance.

Figure 17:
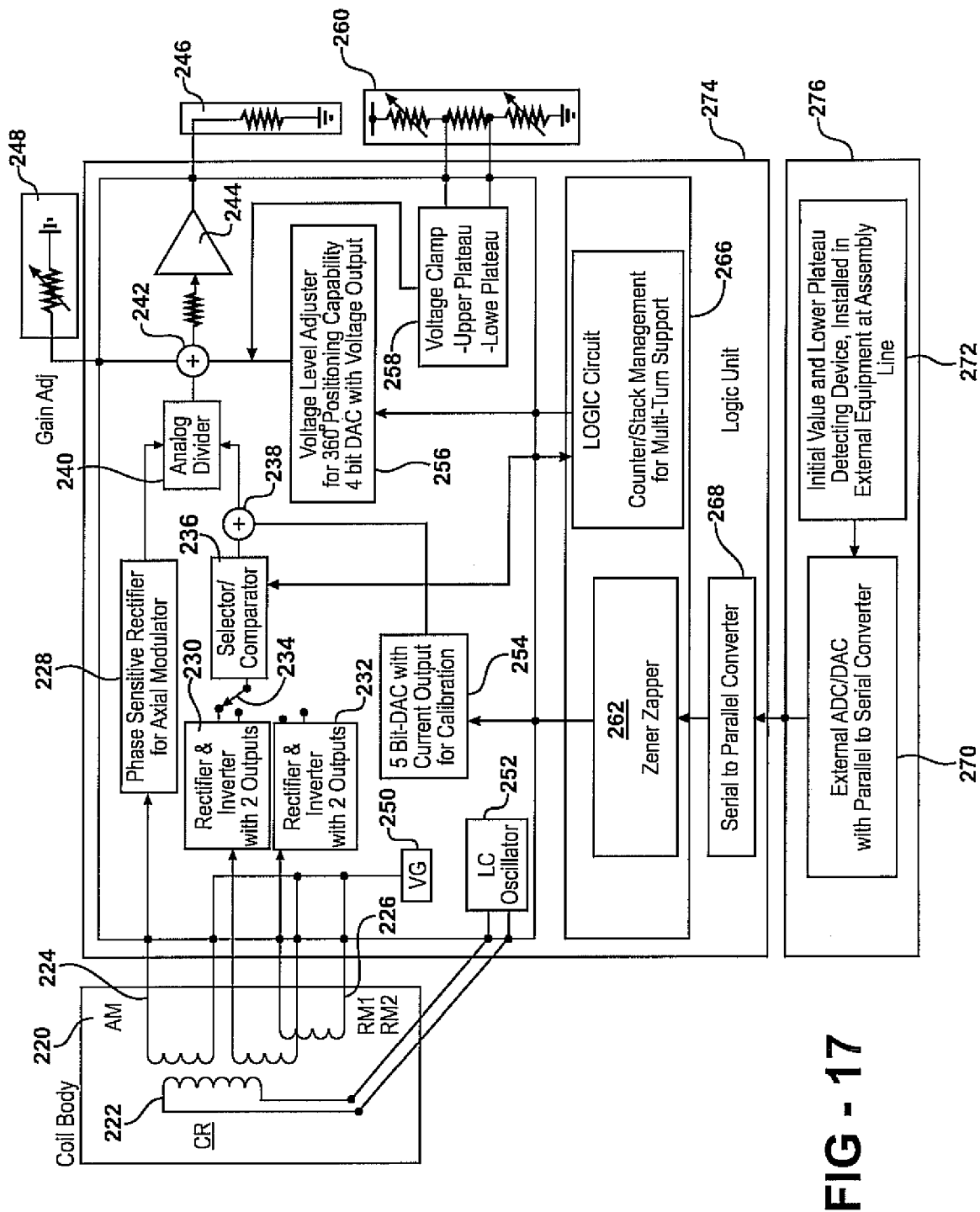
FIG. 17 shows a block diagram of a signal processing circuit which may be used with a multi-turn rotation sensor.

FIG. 17 is a block diagram of a signal processing circuit which may be used with a multi-turn rotation sensor according to an embodiment of the present invention. Briefly, the figure shows a coil body comprising an AM (reference coil), RM1, RM2 (receiver coils), and CR (exciter coil). Here, AM refers to the axial modulator, which provides a signal sensitive to the gap, RM1 and RM2 are the two rotational modulator coils, which are used to provide four outputs, including two inverted outputs, and CR indicates the exciter or carrier coil. The figure shows the selector/comparator circuit under logic circuit control, for multi-turn support. The figure also shows a Zener zapper with five bit DA sensitivity for calibration. An analog division of the selected RM signal and AM signal is performed to obtain the output, the output being adjusted by the voltage level adjuster.

In more detail, the figure shows a coil assembly 220 comprising an exciter coil 222, a separate reference coil 224, and two receiver coils 226 having a phase offset between each other. The signal processing circuit, shown generally at 274, may be supported by the same PCB as the coil assembly. Alternatively, the substrate for the coil assembly may be different. A phase sensitive rectifier 228 is used to process a reference signal from the reference coil. A selector/comparator 236 is used to select a receiver signal from a choice of four, namely rectified and rectified/inverted signals from the two receiver coils respectively, for example as discussed above in relation to FIG. 13. Rectifiers and inverters are show at 230 and 232, with signal selection under comparator control shown at 234. The receiver signal is voltage adjusted at 238, for example so as to obtain a generally linear signal.

An analog divider divides the receiver signal so obtained by the reference signal so as to compensate for common mode factors. Further voltage level adjustment at 242 gives a sensor output through amplifier 244 and load 246. Gain adjustment uses resistor 248. Virtual ground 250 is used to adjust coil signal level. Oscillator 252 (an LC oscillator) energizes exciter coil 222. A 5-bit DAC 254 receives calibration information from Zener zapper 262 (or other non-volatile memory structure) within logic unit shown generally at 266. A counter/stack management circuit 264 tracks the angular range (e.g. number of revolutions or other angular interval), with voltage level adjuster 256 providing a suitable offset voltage. A voltage clamp 258 is used to clamp voltage output to upper and/or lower plateau levels, using resistor bridge 260.

An external circuit 276 comprises sensor output characterization device 272 and external ADC/DAC, giving a calibration output to serial to parallel converter 268, used to set stored values within a Zener array 262 (also referred to as a Zener zapper).

Figure 18:
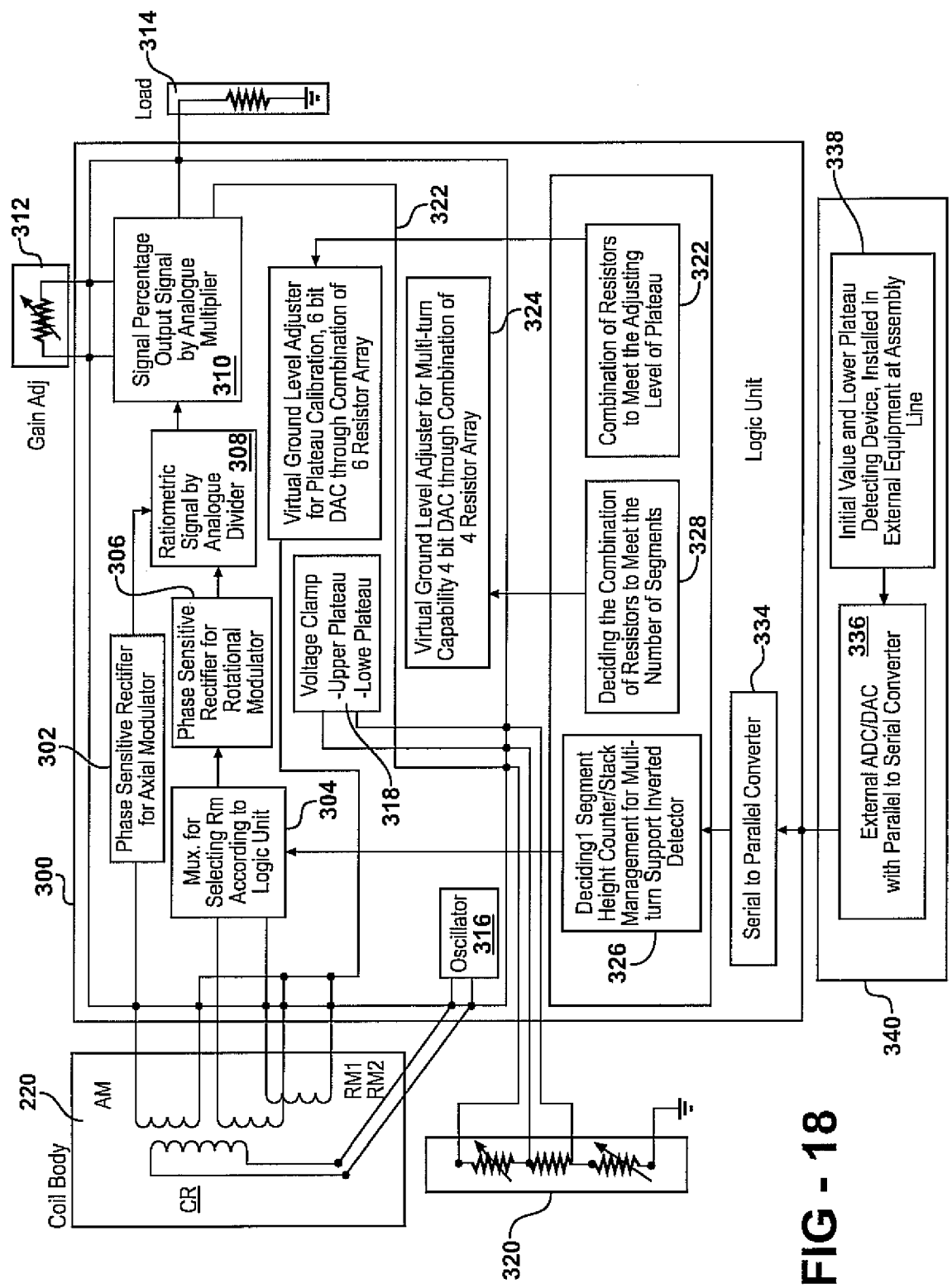
FIG. 18 shows a block diagram of another signal processing circuit which may be used with a multi-turn rotation sensor.

FIG. 18 shows an alternative electronic circuit for a multi-turn rotation sensor. The coil body may be the same as discussed in relation to FIG. 15, indicated as 220. The logic unit decides the counter stack management for multi-turn support, and further determines the combination of resistors required for the segments needed. The logic unit is also used to select the combination of resistors to determine the desired upper and lower plateau voltages.

The circuit shows the two RM signals being selected according to the logic unit, phase-sensitive rectification of the selected RM signal, followed by ratiometric analog division by the axial modulator signal. The output signal is modified by an analog multiplier, with resistor pairs used to clamp plateau positions, a trimmable resistor used for gain adjustment, and output through the load impedance. The circuit shows a virtual ground level adjuster for plateau calibration, with a six bit DAC obtained through combination of six-resistor array.

The figure shows signal processing circuit generally at 300 comprising phase sensitive rectifier 302, multiplexer 304 (e.g. a comparator/selector circuit as discussed elsewhere), phase sensitive rectifier for receiver signal 306, analog divider 308, analog multiplier (amplifier) 310 with gain adjustment resistor 312, output load 314, oscillator 316, voltage clamp 318 using resistor bridge 320, voltage level adjuster (using virtual ground adjuster) 322, and virtual ground adjuster 324. A logic unit 332, which may be on the same PCB and possibly provided by an ASIC, comprises counter/stack controller 326 for angular range segment tracking and providing data on the appropriate voltage adjustment to obtain a substantially linear signal, resistor combination to obtain virtual ground adjustment, and resistor combination to further adjust plateau levels. External calibration equipment 338 is similar to that discussed above in relation to FIG. 17, including sensor output characterization device 338 for measuring output and plateau levels, and external ADC/DAC giving a calibration output to serial to parallel converter 268, for use with the logic unit 332.

External equipment can be used for calibration, for example an external ADC/DAC with parallel-to-serial converter, which is converted back to parallel input to the logic unit. Signal generation using single or plural RM coils for common & differential mode signals can be used in various ratiometric sensors. Ratiometric sensing methods according to examples of the present invention may be used for any sensing technology, and is not limited to inductive sensors. For example, a ratiometric sensor includes one or more sensors, providing sensor signals related to position. A reference signal is derived from the sensor signals. A ratiometric signal is formed by division of the position signal by the reference signal. For example, there may be two or more sensors, and the sensor signals from the two or more sensors combined to provide the reference signal. For example, the sensor signals may be rectified and combined.

The term "RM" is sometimes used as an abbreviation for rotational modulator, the sensor coil of a rotational position sensor. However, the approaches described herein can be used (or readily adapted for use) with any kind of position sensor, including linear and combined linear/rotational inductive sensors, and also for other types of sensors that do not use inductive coupling. For example, a reference signal can be derived from a plurality of Hall sensors, and used for improved ratiometric Hall sensing.

Figure 19:
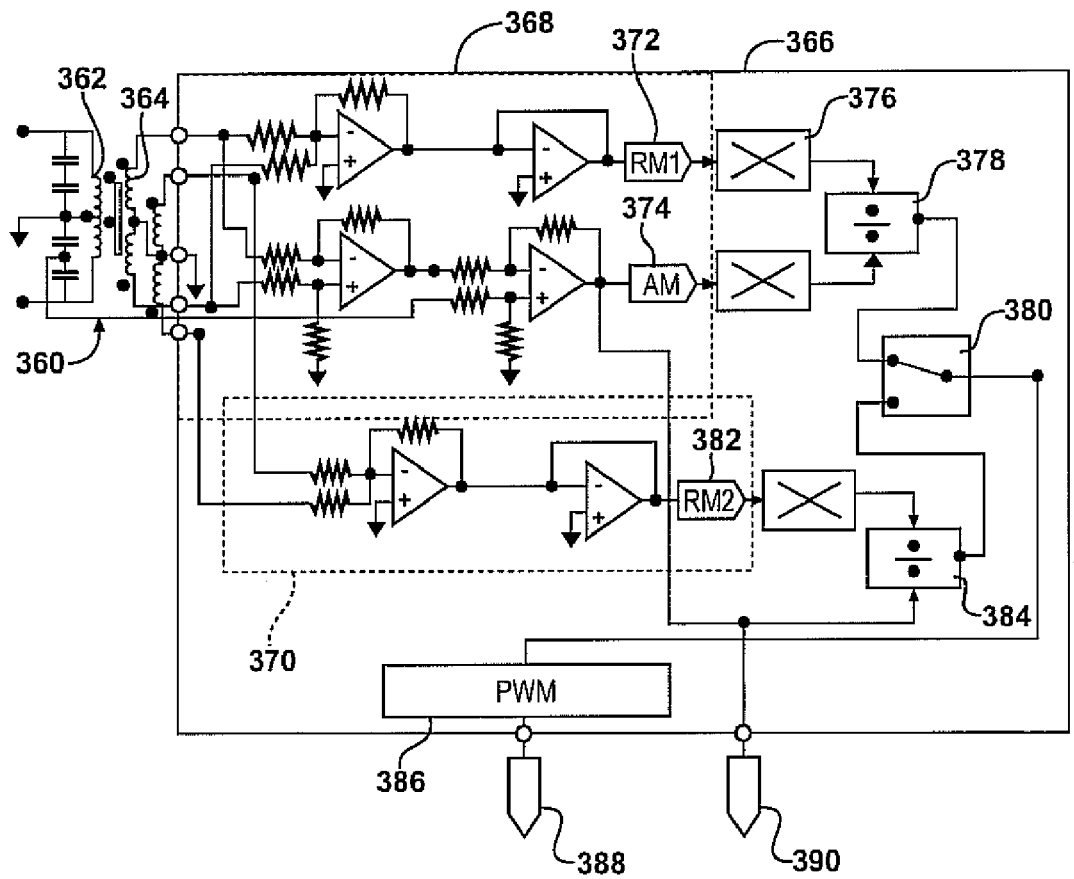
FIG. 19 shows a schematic of a signal processing circuit for a combined steering angle and steering torque sensor.

FIG. 19 shows a schematic for part of a signal conditioning circuit 366 for a combined sensor (steering angle and steering torque determinations) according to embodiments of the present invention. The coil assembly 360 includes exciter coil 362 and four receiver coils such as 364. The figure shows a circuit block 368 to obtain a receiver signal 372 (RM1) correlated with angle and a reference signal 374 (AM) which is substantially independent of angle, but which may be correlated with axial displacement. Hence, the designation AM or axial modulator. After further signal processing at 376, a ratiometric signal is obtained by analog divider 378. However, in all examples described herein, a digital divider may be used in place of analog division. Circuit block 372 is used to obtain a second receiver signal 382 (RM2), which may be divided at 384 to obtain a ratiometric signal. The reference signal is output at 390, and may be used to track axial displacement, and hence angular range or number of revolutions. The signals RM1 or RM2 may be selected using selector 380 and output at 388, optionally with PWM at 386. Other components, such as virtual ground adjustments, calibration data storage, and the like may be readily adapted from other circuits described herein. Plateau control and gain adjustment are not shown for illustrative simplicity.

Figure 20:
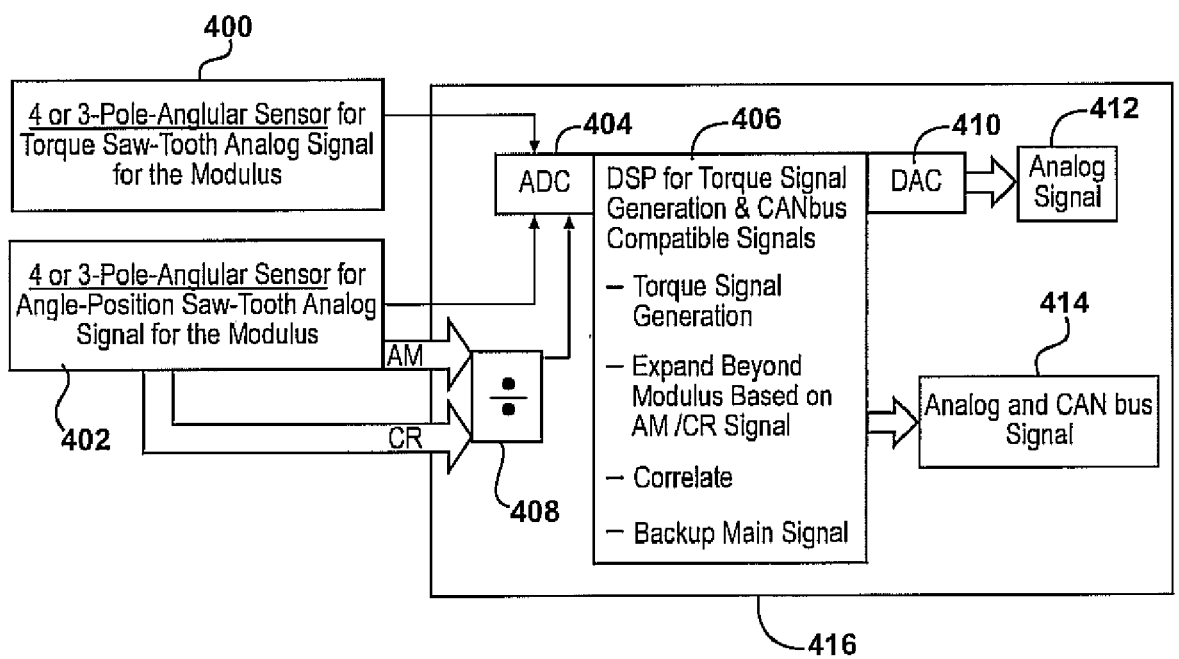
FIG. 20 shows another schematic of a signal processing circuit for a combined sensor.

FIG. 20 shows a simplified schematic of an electronic circuit for signal processing of a combined steering angle/torque sensor. The combined sensor comprises a first coil assembly 400 for torque determination, and a second coil assembly for angle position determination. The coil assemblies each comprise receiver coils and either a reference coil, or circuitry for determining a reference signal from the receiver coil(s). Receiver and reference signals from the angle sensor 402 are passed to an analog divider to form a ratiometric signal. An ADC (analog to digital converter) 404 processes signals from both sensors. Digital signal processing circuit 406 determines the torque, for example by determining the difference between angle measurements to determine a twist angle across a torsion bar. Mechanical parameters of the torsion bar may also be stored in memory and used to convert a twist angle into a torsion value, if necessary. The value of torque can be determined beyond the "modulus" (angular interval of unique rotational sensor output, for example a single rotation of 360 degrees) using the reference signal (AM) to determine an axial displacement and hence a number of revolutions (or other angle modulus value). The torque sensor output can also be used as a backup of the angle sensor output. The two sensor outputs may be compared to determine if a fault condition exists. A DAC 412 is used to generate an analog signal output, and an analog and CAN bus signal is generated by circuitry 414.

Figure 21A:
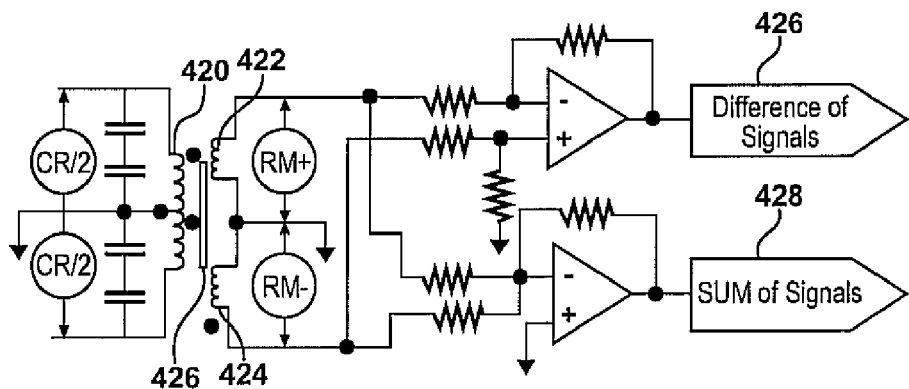
FIGS. 21A-21B show generation of a reference signal using a receiver coil having a center tap.
Figure 21B:
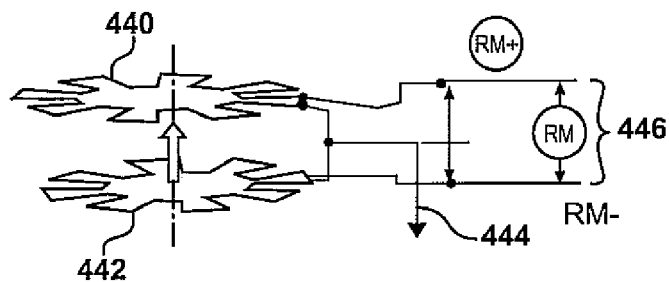

FIGS. 21A-21B show generation of a reference signal using a receiver coil having a center tap. In this example, a separate reference coil is not needed. FIG. 21A shows a possible coil assembly, and FIG. 21B shows a circuit to obtain angle-sensitive (RM) and substantially angle independent signals (AM, reference signal). The reference signal can be used to determine axial displacement in a steering sensor application.

FIG. 21A shows an exciter coil at 420, with coupler element represented at 426 so as to modify inductive coupling with the receiver coils 422. The sum (426) and difference (428) of signals generated by different windings of a receiver coil (or by different receiver coils) are used for rotational position (receiver) and reference signals respectively. FIG. 21B shows two windings 440 and 442 with a center tap 444 used to obtain the RM+ and RM− signals shown in FIG. 21A.

Figure 22B:
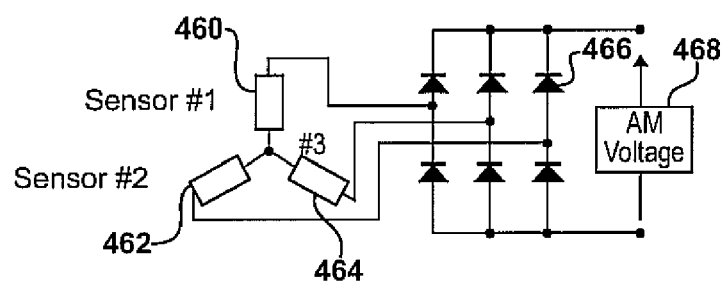
Figure 22C:
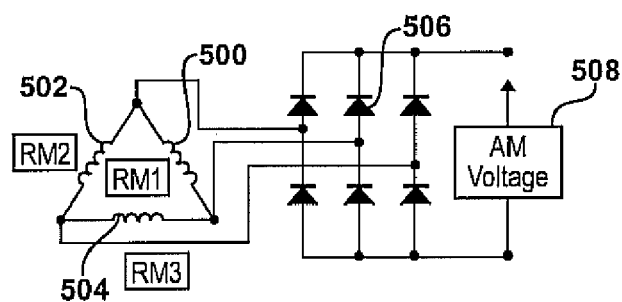

FIGS. 22A-22C show various approaches for obtaining a reference signal from a plurality of sensor signals.

FIG. 22A shows reference signal generation using full wave rectification of three sensor signals. This approach is not limited to inductive sensors. For example, the three sensors may be Hall effect sensors, and the AM voltage (reference signal) used in an analogous manner to correct for common mode, factors, and/or determine axial displacement. The figure shows three sensors 460, 462, and 464, with rectification by diodes 466, and reference signal output at 468. The three sensors, which may be any type of sensor, including inductive, Hall effect, and the like, are configured in a star configuration and diodes 466 (e.g. rectifiers with little or no voltage drop) are used to generate a reference signal. Individual sensor signals may be divided by the reference signal (AM) to provide ratiometric signals.

FIG. 22B shows reference signal generation using three receiver coils (480, 482, and 484) in a star arrangement, with rectification by diodes 486 and reference signal obtained at 488.

FIG. 22C shows reference signal generation using three receiver coils (500, 502, and 504) in a delta or triangular arrangement, with diodes 506 and reference signal output 508. Similarly, this configuration can be used with other sensor types, such as Hall effect sensors.

In an angle sensor, the individual sensors may provide sensor signals correlated with angle. The reference signal may be substantially independent of angular position, but have a relationship with axial displacement. For example, a rotating shaft may cause a variable axial displacement between the sensors shown and another element (such as a coupler element, or magnet in the case of Hall sensors). The reference signal can then be used to determine a number of rotations, or otherwise be used to extend the angular range of a rotation sensor.

Figure 23:
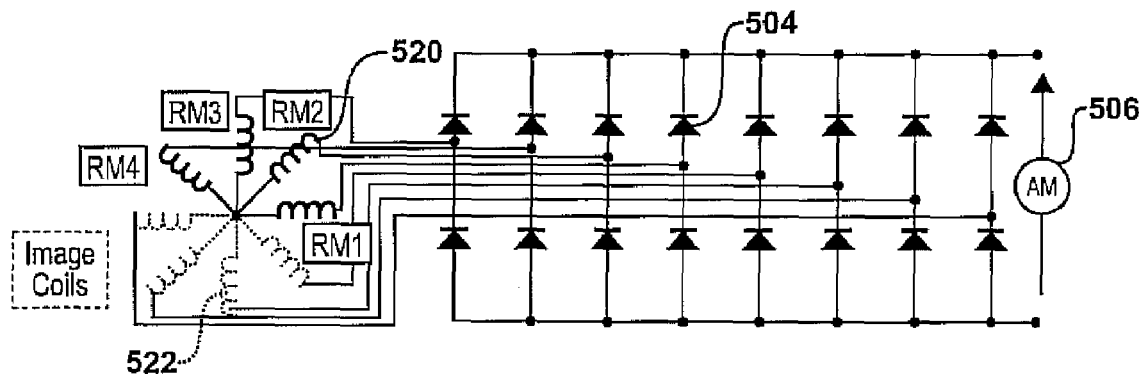
FIG. 23 shows reference signal generation using signals from four receiver coils, and inverted signals therefrom.

FIG. 23 shows a further configuration to obtain a reference signal (denoted AM) from four receiver coils such as 520. In this example, image coils (shown as dashed coils 522) having inverted properties are simulated by copying and inverting the receiver coil signals. A reference signal 506 is obtained using diodes 504.

Figure 24:
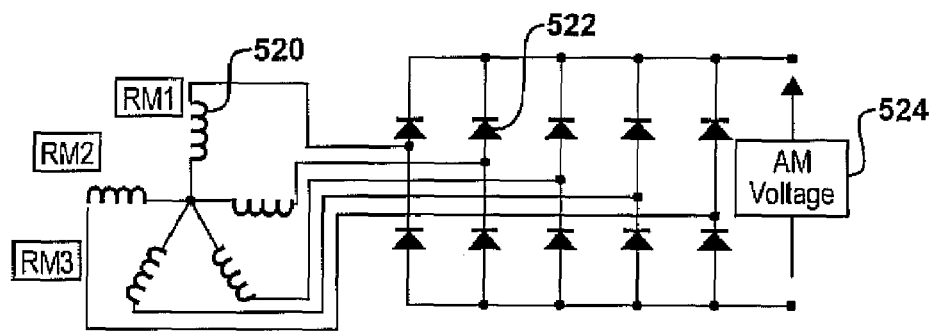
FIG. 24 shows a configuration to obtain a reference signal from five receiver coils.

FIG. 24 shows a further configuration to obtain a reference signal (denoted AM) from five receiver coils 520, using diodes 522 with reference signal obtained at 524. In this example, signal copying and inversion is not required to obtain image coil signals.

Figure 25:
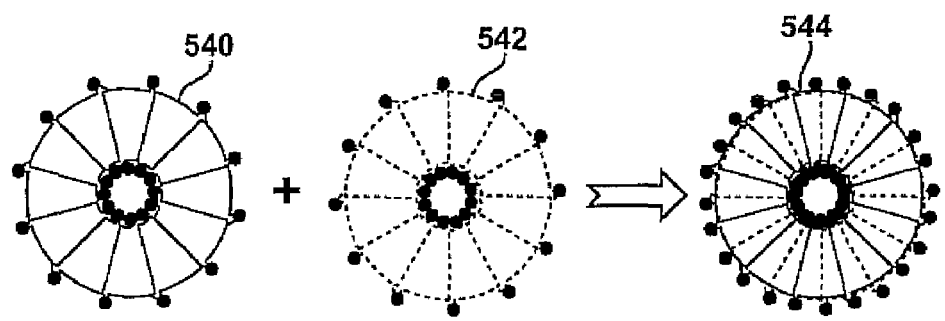
FIG. 25 shows another example of a receiver coil configuration.

FIG. 25 shows another example of a receiver coil configuration. First and second coil assemblies 540 and 542 are combined to obtain coil assembly 544. The second coil assembly, a reference coil, is offset 15 degrees, and may be simulated by combination of receiver coil signals. The reference coil, if used, may be similar in form to the receiver coils so as to minimize the ferro-core effect of a steering column.

Other Configurations

Examples of the present invention further include multi-turn or large angle rotational and linear position sensors. Ratio-metric sensing includes phase free and AM coil free approaches. Any ratiometric sensor, such as those described herein or described in our-copending applications, may be modified by elimination of a separate reference coil (sometimes called an AM or axial modulator coil, providing a gap-dependent signal), and generating a reference signal from the sensor (or receiver) coils (such as RM, rotational modulator, coils). A single coil structure may have taps at intervals so as to allow obtaining signals from which the reference signal is obtained. For example, a coil having a differential structure (e.g. including forwards and backwards wound loops) may be tapped to allow the forwards and backwards signals to be separately obtained. The reference signal may then be obtained from these separate signals.

Approaches described above to obtain a reference signal from a plurality of sensor signals may be used for linear position sensors, and/or other sensor technologies.

Signals of this general type may be obtained from other sensor types, and this approach is not limited to inductive sensors. Electronic circuitry shown is exemplary, and other circuits can be used. Further, these or other circuits may be adapted for use with other types of sensor.

Our co-pending applications are incorporated by reference, in particular including U.S. patent application Ser. No. 11/474,685. Patents, patent applications, or publications mentioned in this specification are incorporated herein by reference to the same extent as if each individual document was specifically and individually indicated to be incorporated by reference.

The invention is not restricted to the illustrative examples described above. Examples are not intended as limitations on the scope of the invention. Methods, apparatus, compositions, and the like described herein are exemplary and not intended as limitations on the scope of the invention. Changes therein and other uses will occur to those skilled in the art. The scope of the invention is defined by the scope of the claims.

I claim:

1. An apparatus for determining steering angle and steering torque for a steering column, the steering column including a first shaft and a second shaft interconnected by a torsion bar, the apparatus comprising;

a first rotational sensor including a first coil assembly and a first coupler element, the first rotational sensor operable to provide a first signal correlated with an angular position of the first shaft, and a signal processing circuit operable to provide a reference signal; and a second rotational sensor including a second coil assembly and a second coupler element, the second rotational sensor operable to provide a second signal correlated with an angular position of the second shaft, wherein the steering angle is determined using a ratiometric signal obtained using the first signal and the reference signal, the steering torque is determined from a twist angle between the angular position of the first shaft and the angular position of the second shaft, the twist angle being determined using the first signal and the second signal, and the reference signal is correlated with an axial displacement of the first coil assembly but otherwise substantially independent of the angular position of the first shaft, the reference signal being used to determine a number of revolutions of the first shaft so as to extend the angular range of the first rotational sensor.

2. The apparatus of claim 1, wherein the first coil assembly includes a plurality of receiver coils and a reference coil,
the reference signal being determined using the reference coil.

3. The apparatus of claim 1, wherein the first coil assembly includes a plurality of receiver coils,
the reference signal being determined using the plurality of receiver coils.

4. The apparatus of claim 1, wherein the axial displacement is relative to the first coupler element.

5. The apparatus of claim 1, wherein the first coil assembly is supported by a coil support having a threaded surface,
the threaded surface engaging with the first shaft so as to produce the axial displacement as the first shaft rotates.

6. The apparatus of claim 1, wherein the twist angle is determined using a digital signal processor.

7. The apparatus of claim 1, wherein the first shaft is a column side shaft, and the second shaft is a pinion side shaft.

8. An apparatus for determining an angular position of a shaft, the apparatus comprising:
a coil support;
a coil assembly supported by the coil support, the coil assembly including a transmitter coil and at least one receiver coil;
a coupler element, the coupler element having a coupler angular position correlated with the angular position of the shaft, the coupler element modifying an inductive coupling between the transmitter coil and the at least one receiver coil; and
a signal processing circuit operable to receive at least one receiver signal from the at least one receiver coil,
the signal processing circuit further operable to provide a reference signal correlated with an axial displacement of the coil assembly relative to the coupler element and otherwise substantially independent of the angular position, the axial displacement being produced by rotation of the shaft,
the signal processing circuit further operable to determine the angular position of the shaft using a ratiometric signal obtained using the at least one receiver signal and the reference signal,
the reference signal being used to determine a number of revolutions of the shaft, so as to extend the angular range of the apparatus beyond a single revolution.

9. The apparatus of claim 8, wherein the shaft is a component of a steering column.

10. The apparatus of claim 8, wherein the coil support is a printed circuit board, the printed circuit board further supporting the signal processing circuit.

11. The apparatus of claim 8, wherein the coil support is mounted on a threaded sleeve, the threaded sleeve engaging with the shaft so as to produce the axial displacement as the shaft rotates.

12. The apparatus of claim 8, wherein the shaft is a component of a steering column, the steering column comprising a second shaft interconnected with the first shaft by a torsion bar, the apparatus further comprising a rotational sensor to determine a second angular position of the second shaft,
the apparatus further comprising a rotational sensor operable to determine a second angular position of the second shaft; and
an electronic circuit operable to determine a steering torque using the angular position of the shaft and the second angular position of the second shaft.

* * * * *